United States Patent [19]
D'Souza

[11] Patent Number: 5,193,617
[45] Date of Patent: Mar. 16, 1993

[54] MICRO-SLUG INJECTION OF SURFACTANTS IN AN ENHANCED OIL RECOVERY PROCESS

[75] Inventor: Adrian D'Souza, Richmond, Calif.

[73] Assignee: Chevron Research and Technology Company, San Francisco, Calif.

[21] Appl. No.: 733,708

[22] Filed: Jul. 22, 1991

[51] Int. Cl.⁵ .................. E21B 43/22; E21B 43/24
[52] U.S. Cl. .................. 166/263; 166/272; 166/273; 166/305.1; 166/309; 166/53
[58] Field of Search ........... 166/252, 263, 272, 273, 166/274, 303, 305.1, 309, 53

[56] References Cited

U.S. PATENT DOCUMENTS

| | | | |
|---|---|---|---|
| 4,488,598 | 12/1984 | Duerksen | 166/252 |
| 4,601,337 | 7/1986 | Lau et al. | 166/263 |
| 4,706,752 | 11/1987 | Holm | 166/273 |
| 4,721,158 | 1/1988 | Merritt, Jr. et al. | 166/252 X |
| 4,852,653 | 8/1989 | Borchardt | 166/272 |
| 4,856,589 | 8/1989 | Kuhlman et al. | 166/273 |
| 4,953,618 | 9/1990 | Hamid et al. | 166/53 X |
| 5,052,487 | 10/1991 | Wall | 166/303 X |

Primary Examiner—George A. Suchfield
Attorney, Agent, or Firm—Burns, Doane, Swecker & Mathis

[57] ABSTRACT

A method for introducing a surfactant into an oil bearing formation includes plurality of a micro-slug injections of surfactant. Each micro-slug injection comprises an "on time" in which the surfactant is introduced into the formation and which is based upon the time needed for the surfactant to generate foam in the formation and a "off time" in which surfactant flow is stopped and is based upon the time period for the generated foam to degrade to a predetermined degree in the formation.

16 Claims, 2 Drawing Sheets

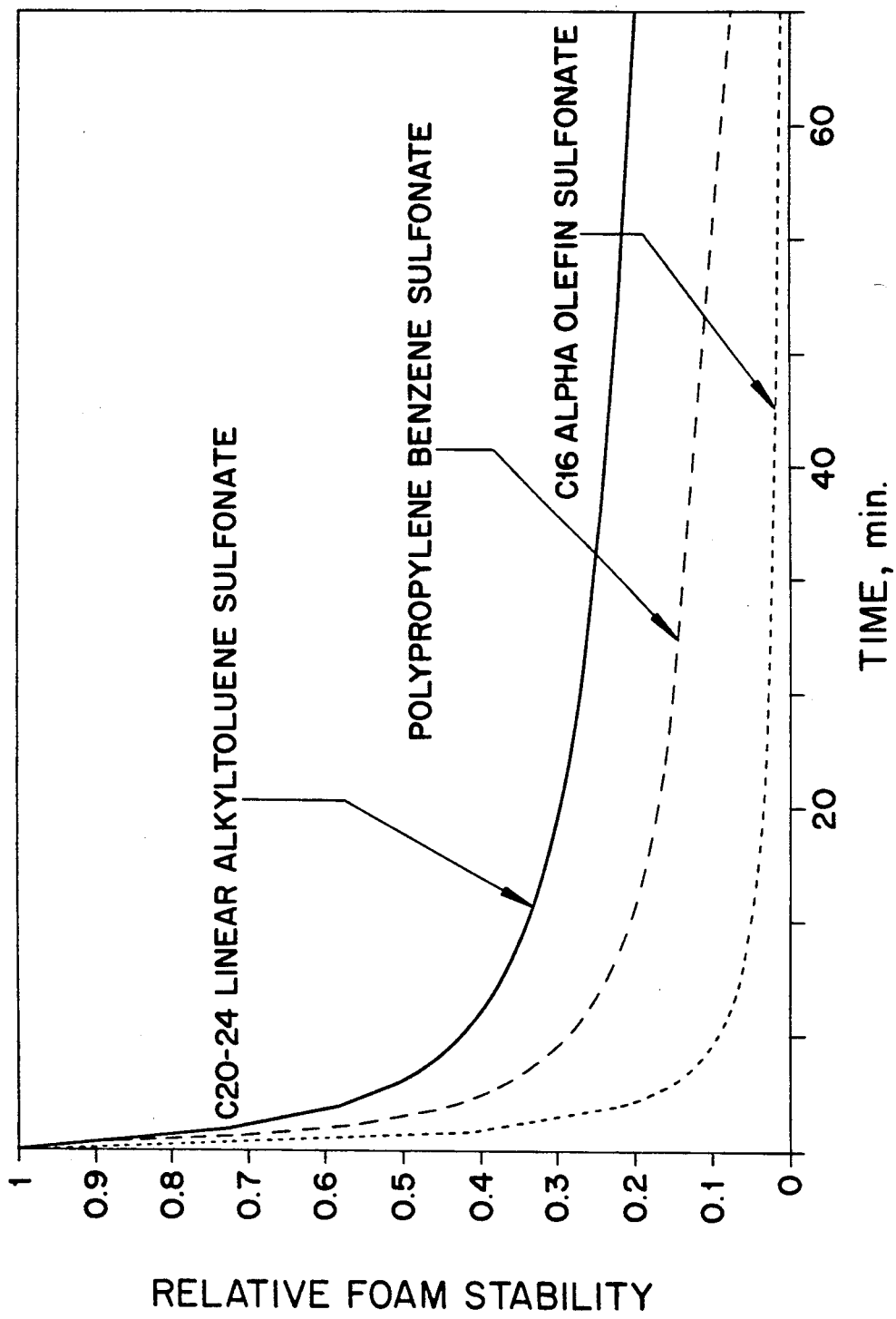

MICRO-SLUG INJECTION OF SURFACTANTS IN AN ENHANCED OIL RECOVERY PROCESS

BACKGROUND OF THE INVENTION

The present invention relates to a method for enhancing recovery of the petroleum from an oil bearing formation. In particular, the invention relates to a method for introducing a surfactant into an oil bearing formation.

In the recovery of oils from reservoirs, the use of primary production techniques (i.e., use of only the initial formation energy to recover the crude oil), followed by the secondary technique of water flooding recovers only about 60% to 70% of the original oil present in the formation.

Moreover, the use of certain enhanced oil recovery (EOR) techniques is also known in the art. These techniques can be generally classified as a thermally based recovery method, i.e., utilizing steam, or a gas-drive method that can be operated under either miscible or non-miscible conditions. Typical gases employed in gas-drive method include those normally referred to as non-condensable gases, for example, nitrogen, carbon dioxide, methane, mixtures of methane with ethane, propane, butane, or higher hydrocarbon homologues.

In each of these EOR methods, it has been proposed to introduce a surfactant in order to increase the effectiveness of the particular process. For example, a number of commercial surfactants have been injected along with a steam stream to create a steam-foam flood. Surfactants form a foam that inhibits the flow of the steam into that portion of the formation containing only residual oil saturation in serves to physically block the volumes through which steam would otherwise shortcut. This forces the steam to remove the recoverable hydrocarbons from the lesser portions of the reservoir to the production well. Surfactants have also been employed within gas-drive methods in order to overcome a similar problem relating to bypassing of the non-condensable gas, e.g., $CO_2$, through pores of the reservoir.

Typically, the surfactant is introduced according to a slug flow injection process in which the surfactant is continuously introduced over an eight hour period so as to generate a foam in the reservoir which foam formation can be evidenced by an increase the wellhead pressure from, e.g., 400 psi to 500 psi. The flow of surfactant is then stopped for the balance of the cycle, e.g., 16 hours in the traditional 24 hour cycle. Because many foams degrade relatively quickly, there can be substantially no foam present in the formation during much of this 24 hour cycle.

Thus, the need still exists for a method which makes more effective use of the surfactant during an EOR process.

Accordingly, it is an object of the present invention to provide a method which allows for a decrease in the amount of surfactant employed while at the same time maintaining foam in the formation.

These and further objects will be apparent from the specification and claims which follow.

SUMMARY OF THE INVENTION

In accordance with foregoing objectives, the present invention relates to a method for introducing a surfactant into an oil-bearing formation. In particular, the process comprises a plurality of micro-slug injections of surfactant where each injection consists of an "on time" in which the surfactant is introduced into the formation and an "off time" in which surfactant flow is stopped.

The "on time" is selected based upon the time needed for the surfactant to generate a foam in the formation while the "off time" is selected based upon a time period for the generated foam to degrade to a predetermined degree.

In a preferred embodiment, the process is a two step process which comprises a first stage in which the surfactant is initially introduced into the formation for a time sufficient to generate foam in the formation and a second stage which comprises the plurality of micro-slug injections of surfactant and which maintains the desired degree of foaming in the formation.

The present invention also relates to an apparatus for controlling the micro-slug injection process.

BRIEF DESCRIPTION OF THE DRAWINGS

FIG. 2 illustrates the results from Example 1 appearing in the specification.

DETAILED DESCRIPTION OF THE PREFERRED EMBODIMENTS

Figure 1:
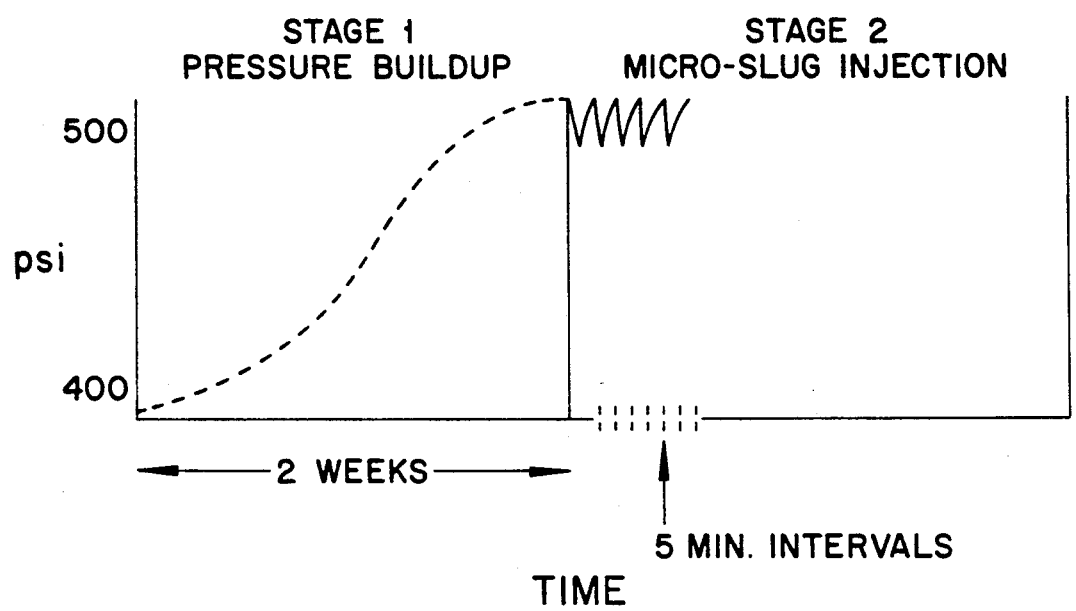
FIG. 1 illustrates the two stage process according to the present invention.

The present invention relates to a method of introducing a surfactant stream into an oil-bearing formation during an enhanced oil recovery process. This method can be effectively employed with any of those enhanced oil recovery processes recognized in the art. In preferred embodiments, this method is employed with either a thermally based recovery technique utilizing steam or a gas-drive based technique.

The process of the present invention involves the "micro-slug injection" of a surfactant stream into the formation. By "micro-slug injection" is meant a cyclic injection based on the formation and degradation of foam within the oil-bearing formation.

In one aspect, the process of the present invention involves a two stage process. The first stage comprises the initial, and preferably continuous, introduction of a surfactant into the oil bearing formation such that a desired foam is generated. Once the desired degree of foam formation has been achieved, the process then enters the second stage, i.e., the plurality of micro-slug introductions of surfactant into the formation in order to maintain the desired degree of foam formation in the formation. See, for example, FIG. 1.

In particular, the micro-slug injection "cycle" comprises an "on time" in which surfactant is introduced into the formation and which is that time necessary to generate the foam in the formation, as determined by known techniques, such as the increase in the pressure at, e.g., the wellhead, and an "off time" in which surfactant flow is stopped and which is that time associated with a predetermined degree of degradation of the foam, which degradation can be illustrated by the decrease in the same pressure drop.

In particular, the minimum "on time" associated with a particular surfactant is that time needed to attain the desired pressure drop in the formation.

Preferably, the "off time " is characterized by the time associated with a decrease in the wellhead pressure increase of not greater than about 90%, more preferably not greater than 50%, still more preferably not greater than about 10% relative to the wellhead pressure increase at the end of the "on time".

If, for example, the pressure increase during the first stage of the process is 100 psi, e.g., from 400 psi at the start of the process to 500 psi, then it is preferred that the pressure decrease during the "off time" be no more than 90%, of pressure in the absence of added surfactant, e.g., a decrease from 500 psi to 410 psi, preferably the decrease should be no more than 50%, e.g., to 450 psi, more preferably no more than 10%, e.g., to 490 psi.

The surfactants which can be employed in the present invention include any of those traditionally employed in enhanced oil recovery operations, e.g., thermal based techniques with the choice of a particular surfactant being dependent upon the particular EOR technique being employed, the reservoir lithology and reservoir brine.

The calculation of the time periods associated with foam formation and degradation for a particular surfactant can be determined by those means recognized in the art, e.g., determining the increase and decrease in the pressure directly at the well bore or pressure drop increase and decrease in the laboratory via the use of sand pack and core flood processes. Preferably, the calculations are based on wellhead pressure measurements.

Although it depends on the particular surfactant employed, the "on time" is preferably less than about 15 minutes, more preferably less than about 5 minutes, still more preferably less than about 2 minutes, while the "off time" is preferably less than about one hour, preferably less than about 10 minutes, more preferably less than about 5 minutes. In other words, the total cycle time is preferably less than about two hours, preferably less than 30 minutes, still more preferably less than 10 minutes, and even still more preferably, about 5 minutes.

Once these time periods to be employed with a particular surfactant are selected, the micro-slug injection of the surfactant can be controlled by any effective control means recognized in the art.

In one preferred embodiment, a dual automatic control arrangement is employed. See FIGS. 3A and 3B. This dual control arrangement involves a first control means 1, which controls the "total cycle time" as discussed above and a second control means 2, which controls the percentage of the total cycle time which is "on time". This dual arrangement allows for the automatic control of the micro-slug injection process.

Figure 3A:
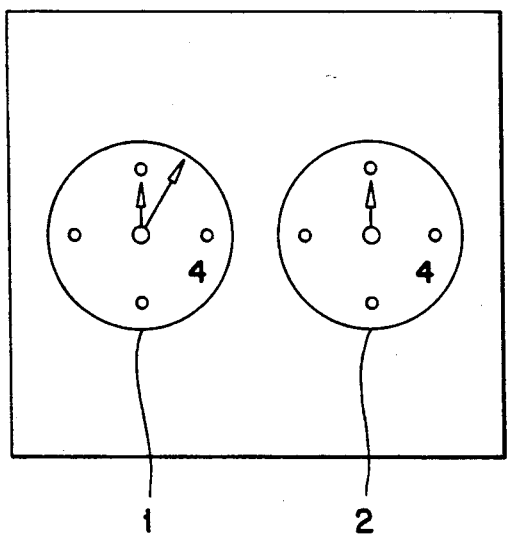
FIGS. 3A and 3B illustrate an automatic control arrangement according to the present invention.
Figure 3B:
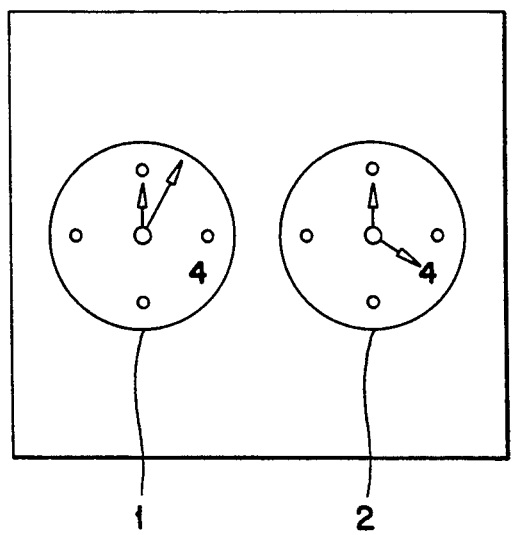

For example, in the preferred two-stage process previously discussed, the first control means is set for a total cycle time of 5 minutes (1 of FIG. 3A). During the first or initial foam generation stage of the two-stage process, the second control means is set at "100%" (2 of FIG. 3A) so that surfactant is continuously introduced into the formation until the desired degree of foam forming occurs.

At the beginning of the second stage of the two-stage process, the second control means is then set so that the percentage of on stream time is, e.g., 30% (2 of FIG. 3B) whereby the process involves a sequence of about 3.5 minutes of "off time" followed by 1.5 minutes of "on time" during the total cycle of 5 minutes.

As discussed above, the exact length of time for each portion of the micro-slug injection is based upon the formation and degradation of the foam formed by a particular surfactant. However, in order to make efficient use of the surfactant, it is preferred that the percent on time in the second stage of the process is not greater than about 30%, more preferably not greater than about 25%.

The control means which can be employed in this process can include, e.g., any of those microprocessor control means which are recognized in the art and thus need not be further described here.

In addition to automatic control means such as that discussed above, art-recognized manual control means can also be employed although due to the short periods of time associated with the preferred micro-slug injection process of the present invention, it is believed that this method would be less efficient than automatic control of the process.

The process of the present invention is capable of reducing the amount of surfactant employed, as illustrated by the fact that the total percent of "on time" in the process of the present invention can be 25% or less while that associated with traditions prior art slug techniques is on the order of 33%, while at the same time being capable of providing improved foam generation in the formula as illustrated by e.g., the more consistent pressure drop at the wellhead.

In order to further illustrate the present invention and the advantages thereof, the following specific Examples are given, it being understood that same are intended only as illustrative an in no wise limitive.

EXAMPLE 1

This example illustrates the ability to determine the cycle time and the "off time" based upon the degradation of the foam, as illustrated by the decrease in the pressure drop.

The following example illustrates the foam stability of certain surfactants through the use of sand pack foam test.

The first surfactant employed in this example was a $C_{20-24}$ linear alkyl toluene sulfonate (2024 LATS), the second surfactant was a polypropylene benzene surfactant (PPBS) and the third surfactant was a $C_{16-18}$ alpha olefin sulfonate (1618 AOS). The results for the three surfactants are illustrated in FIG. 2.

The test sequence is as follows:
1. All steps were carried out at 400° F., 325 psi.
2. Saturate the pack with steam generator feed water (SGFW).
3. Flow of 2.5 liquid per volumes (lpv) of Residual Kern River oil through the pack at the rate of 0.5 ml/min.
4. Flow of 4 lpv of SGFW through the pack at 0.5 ml/min.
5. Start the surfactant solution.
6. Turn on the non-condensable gas (nitrogen) at the chosen rate.
7. Continue until the pressure reaches the plateau maximum.
8. Go back to step 2 of the next sample.

Accordingly, as can be seen, one can easily determine the degradation of foam stability over time and thus calculate both the desired "on time" and "off time" associated with the micro-slug injection of the present invention.

EXAMPLE 2

This example illustrates a two stage process according to the present invention.

Steam is injected into a steam injector in an inverse 5-spot production pattern. The wellhead pressure is 400 psi at a flow rate of 350 BBL/day cold water equivalent of 60% quality steam.

A $C_{20-24}$ linear alkyl toluene sulfonate is injected continuously for two weeks as 0.5% by weight of the liquid phase of the steam. Thereafter, micro-slug injection of the surfactant is commenced and continued for the rest of the project. A total cycle time of five minutes is used, with an on-stream time of 30%, i.e., 1.5 minutes "on" and 3.5 minutes "off". Pressure during the continuous injection increase to 500 psi and is maintained over the two week period. The pressure then fluctuates in the range of 450–500 psi during the micro-slug injection. The pressure versus time is illustrated in FIG. 1.

While the invention is described in terms of various preferred embodiments, the artisan will appreciate the various modifications, substitutes, omissions, and changes may be made without departing from the spirit thereof. Accordingly, it is intended that the scope of the present invention be limited solely by the scope of the following claims including equivalents thereof.

I claim:

1. A method for introducing a surfactant into an oil-bearing formation comprising a plurality of micro-slug injections of surfactant into the formation;
   wherein each micro-slug injection comprises introducing a surfactant into the formation for a period of "on time" which is based upon the time needed for the surfactant to generate a desired foam in the formation, followed by stopping of the surfactant flow for a period of "off time" which is based upon the time period for the foam to degrade to a predetermined degree.

2. The method according to claim 1 wherein the method further comprises a first stage which comprises the initial introduction of surfactant into the formation for a time sufficient to generate foam in the formation and a second stage which comprises the plurality of micro-slug injections of surfactant into the formation.

3. The method according to claim 2 wherein the combination of "on time" and "off time" is "total cycle time" and the total cycle time for each micro-slug injection is not greater than about 2 hours.

4. The method according to claim 3 wherein the total cycle time is not greater than about 10 minutes.

5. The method according to claim 4 wherein the percent of total cycle time which is "on time" is not greater than about 30%.

6. The method according to claim 4 wherein the percent of total cycle time which is "on time" is not greater than about 25%.

7. The method according to claim 2 wherein the "on time" is not greater than about 10 minutes and the "off time" is not greater than about 1 hour in each cycle.

8. The method according to claim 7 wherein the "on time" is not greater than about 2 minutes and the "off time" is not greater than about 5 minutes.

9. The method according to claim 2 wherein the "off time" corresponds to a degree of foam degradation of about 50%, based upon the decrease in pressure drop.

10. The method according to claim 2 wherein the "off time" corresponds to a degree of foam degradation of about 90%, based upon the decrease in pressure drop.

11. The method according to claim 2 wherein the process is controlled by a first automatic control means for controlling the total cycle time and a second automatic control means for controlling the percent "on time" of the total cycle time.

12. The method according to claim 11 wherein the first automatic control means is set such that the total cycle time is not greater than about 1 hour and the second automatic control means is set during the first stage of the process at 100% and during the second stage of the process at not greater than 30%.

13. The method according to claim 12 wherein each of the automatic control means is a microprocessor.

14. An apparatus for controlling the micro-slug introduction of a surfactant into an oil-bearing formation comprising a first automatic control means for controlling total cycle time for the introduction of surfactant, wherein the total cycle time comprises an "on time" in which surfactant is introduced into the formation and which is based upon the time needed for the surfactant to generate a desired foam in the formation and an "off time" in which surfactant flow is stopped and which is based upon the time period for the foam to degrade to a predetermined degree, and;
   a second automatic control means for controlling the percent "on time" of the total cycle time.

15. The apparatus according to claim 14 wherein the first automatic control means is capable of being set for a total cycle time of about 1 hour or less and the second automatic control means is capable of being set at any percentage from 0–100%.

16. The apparatus according to claim 14 wherein each of the automatic control means is a microprocessor.

* * * * *